United States Patent [19]
Hoffmann

[11] Patent Number: 4,827,983
[45] Date of Patent: May 9, 1989

[54] SWIVELING MOUNT FOR THE OUTLET OF A PRESSURE VESSEL

[75] Inventor: Ralph M. Hoffmann, Eden Prairie, Minn.

[73] Assignee: Compression Technologies, Inc., Eden Prairie, Minn.

[21] Appl. No.: 150,790

[22] Filed: Feb. 1, 1988

[51] Int. Cl.⁴ .................. A01G 25/09; F16K 31/12
[52] U.S. Cl. .................. 137/899.4; 137/505.42; 137/557; 137/580
[58] Field of Search ............ 137/899.4, 557, 505.39, 137/505.42, 615, 580; 285/93, 272

[56] References Cited

U.S. PATENT DOCUMENTS

| | | | |
|---|---|---|---|
| 638,251 | 12/1899 | Kleinfeldt | 137/505.39 |
| 2,089,547 | 8/1937 | Folliot | 137/580 |
| 2,156,823 | 5/1939 | Stettner | 137/505.42 |
| 2,195,728 | 4/1940 | Jones et al. | 137/505.42 |
| 2,261,027 | 10/1941 | Hopkins | 73/31 |
| 2,747,607 | 5/1956 | Matasovic | 137/505.42 |
| 2,918,081 | 12/1959 | Lauer, Jr. | 137/505.42 |
| 3,041,880 | 7/1962 | McCarvell et al. | 73/420 |
| 4,176,558 | 12/1979 | Wetterhorn | 73/741 |
| 4,196,634 | 4/1980 | Hehl | 73/756 |
| 4,702,276 | 10/1987 | Bouteille et al. | 137/580 |

FOREIGN PATENT DOCUMENTS

| | | |
|---|---|---|
| 669827 | 1/1939 | Fed. Rep. of Germany . |
| 42335 | 2/1987 | Fed. Rep. of Germany 137/505.39 |

Primary Examiner—A. Michael Chambers
Attorney, Agent, or Firm—Hill, Van Santen, Steadman & Simpson

[57] ABSTRACT

A swivel mount for the outlet conduit of a pressure vessel is disclosed that can be rotated to a desired position to provide access to a component attached to the mount without interrupting the flow of material from the pressure vessel to the mount and the component. The mount includes a hollow stem that is surrounded by and is in rotational sealing engagement with a sleeve. A sealed chamber is formed between the sleeve and the stem that receives material from the outlet conduit of the pressure vessel through a laterl aperture in the stem. The sleeve itself has at least one outlet conduit that is joined to the chamber and can direct material from the chamber to the component.

13 Claims, 1 Drawing Sheet

U.S. Patent
May 9, 1989
4,827,983
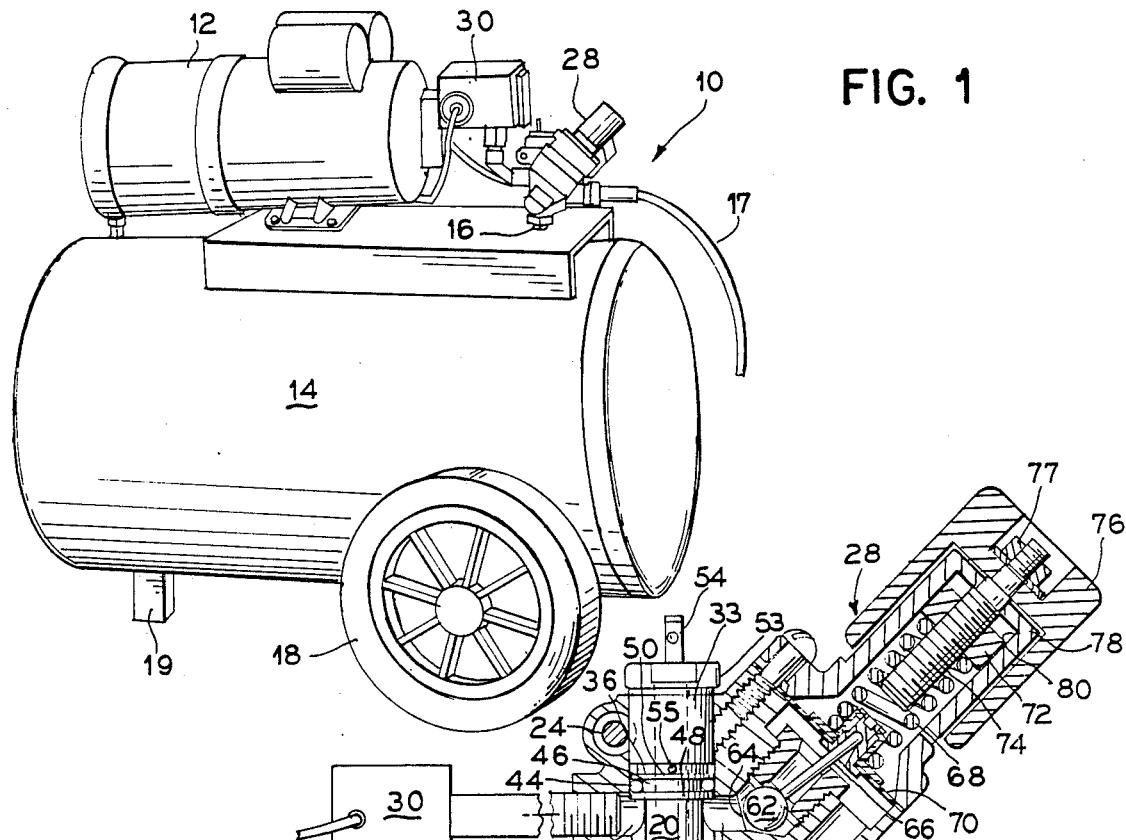
FIG. 1
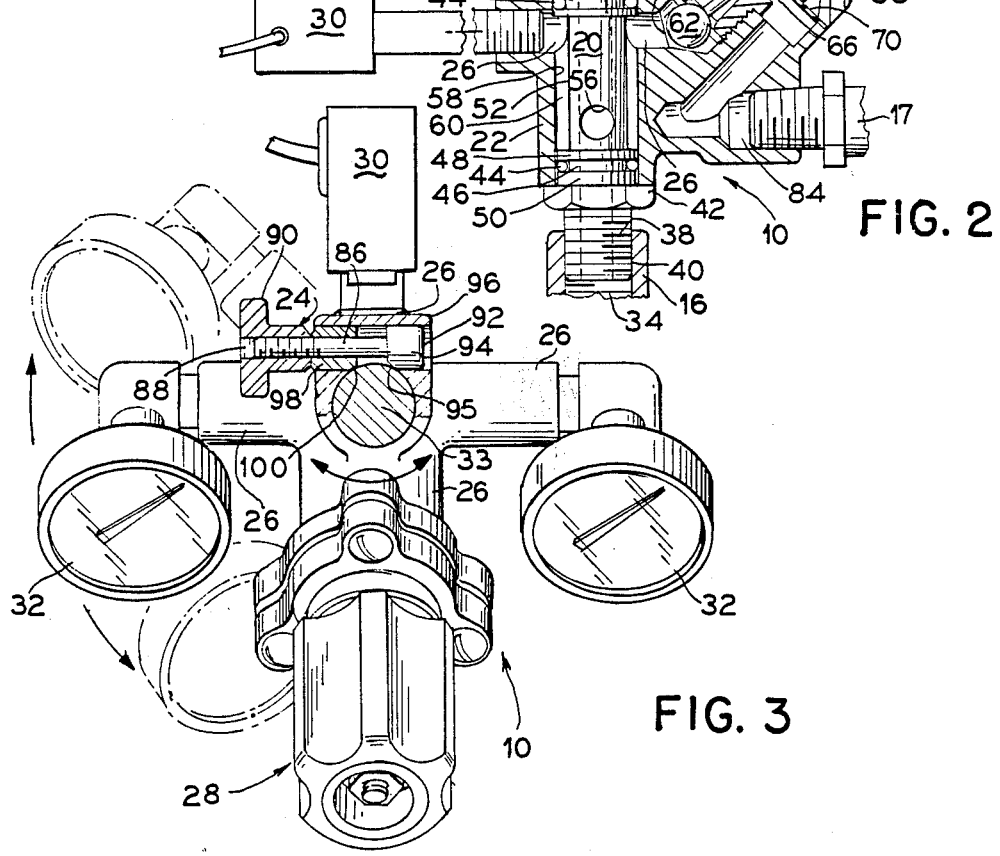
FIG. 2
FIG. 3

SWIVELING MOUNT FOR THE OUTLET OF A PRESSURE VESSEL

BACKGROUND OF THE INVENTION

The present invention relates generally to a mount for the outlet of a pressure vessel. More specifically, the present invention relates to a mount for the outlet of an air compressor where the mount itself has a plurality of outlets which may be fitted with various components and the mount, along with the components, is rotatable with respect to the air compressor without interrupting air flow through the mount and the components affixed thereto.

Air compressors typically are designed with numerous outlets which are fitted with various components to monitor and control the operation of the compressor. These components include, for example: a regulator, for adjusting the flow of air from within the compressor tank; pressure gauges, for monitoring pressure; a safety valve, for providing an automatic shut-off of the compressor when the pressure within the compressor tank reaches a prescribed level; and a valve, for facilitating start-up and shutdown operations of the compressor. These components are usually affixed individually, and in combination, to an outlet of the compressor through mounting structures that are usually threadingly engaged to the outlet of the air compressor and provide a single positioning of the components after the mounts are threaded to their final, fully tightened positions. Consequently, this final position frequently does not provide easy access to these components and may not readily be altered to provide access, which is especially important if the compressor is to be positioned in different locations and directions during use. In practice, the mounting structures are sometimes slightly unthreaded to provide access to the components, a practice which obviously is not desirable.

It would therefore be advantageous to provide a mount for an outlet of an air compressor that can be fitted with a single component where the mount can be rotated with respect to the air compressor without tampering with the seal between the mount and the outlet allowing access to the component as desired.

It would be further advantageous to provide a mount for an outlet of an air compressor where the mount itself has a plurality of outlets, each outlet being fitted with one or more components and the mount, along with the components, can be rotated with respect to the air compressor for ease of access to the components. Such rotation, for example, would permit access to the regulator so that it could be adjusted while the other components are visible and accessible to an operator without having to look or reach over the compressor or move the compressor itself. Such a construction would thereby lessen the chance of damage to the compressor or injury to the operator, as well as assure an accurate reading and pressure regulation.

Moreover it would be desirable to provide a mount that is rotatable to a desired position and can then be readily locked into the desired position to prevent further movement of the mount until required.

SUMMARY OF THE INVENTION

The present invention provides a mount for an outlet conduit of a pressure vessel where the mount itself has at least one integrally formed outlet conduit that can have a desired component affixed thereto, and the mount, along with the component, may be rotated with respect to the pressure vessel to provide access to the component by an operator.

To this end, the present invention provides an elongated, hollow tube or stem having a reduced diameter central portion whose distal end is closed and whose proximal end is open and is threadingly engaged to the outlet conduit of the pressure vessel which provides flow of material into the hollow stem from the pressure vessel. The stem has a lateral aperture located within the reduced diameter central portion as well as at least two resilient sealing rings positioned on either side of the reduced diameter central portion around the external periphery of the stem.

A hollow sleeve surrounds and embraces the stem and has an inside diameter that is in sealing engagement with the sealing rings to form an effective seal between the stem and the sleeve at either end of the reduced diameter central portion of the stem. A sealed chamber is thereby formed between the sleeve, the reduced diameter central portion of the stem, and the sealing rings where the chamber receives material from the pressure vessel through the lateral aperture of the stem. The sleeve has at least one outlet conduit positoned along its length which is joined to the chamber, and, due to the mounting of the sleeve with the sealing rings, the sleeve is capable of rotating about the stem to a desired position. The component can be affixed to the outlet conduit of the sleeve and the component can be rotated along with the sleeve to a desired position to provide the necessary access to an operator while maintaining flow of material from the pressure vessel to the mount.

In an embodiment of the present invention, the sleeve of the mount may have a plurality of integrally formed outlet conduits around it periphery which are each fitted with one or more components to monitor and/or control the material within the pressure vessel. In this embodiment, the sleeve, with the fitted components attached, can be rotated in unison about the stem to a desired position to enable access to the components.

In an embodiment a screw clamp is integrally formed with the elongated sleeve near the distal end of the stem which can be tightened to lock the sleeve in a desired position. To adjust the sleeve and associated components the screw is loosened.

BRIEF DESCRIPTION OF THE DRAWINGS

Additional features and advantages of the present invention are set forth with particularity in the appended claims. The invention may best be understood by making reference to the following description, taken in conjunction with the accompanying drawings and several figures of which like reference numerals identify identical elements and wherein:

FIG. 1 illustrates a perspective view of a mount of the present invention shown in conjunction with an air compressor;

FIG. 2 illustrates a cross-sectional view of the mount of the present invention fitted with several components; and FIG. 3 illustrates a top plan view of the mount with several components affixed, illustrating the clamp of the mount in partial cross section and illustrating the rotation of the mount.

DETAILED DESCRIPTION OF THE PRESENTLY PREFERRED EMBODIMENTS

The principles of the present invention are incorporated in a mount generally indicated in the drawings by reference numeral 10. The mount 10 is normally used in conjunction with an air compressor 12 having a pressure tank 14, a compressed air outlet conduit 16, and an air hose 17. It should be understood, however, that the mount 10 of the present invention can be used in a variety of different ways and with a variety of components to monitor and control air or any other desired material without departing from the scope of the present invention.

In the embodiment illustrated, the pressure tank 14 is mounted on wheels 18 that are positioned on either side of the tank 14. The wheels 18 function to provide a means for transporting the compressed air tank 14 and the compressor 12 to a desired location. To stabilize and level the entire assembly a leg 19 can be affixed to the tank 14.

As illustrated in FIG. 2, the mount 10 includes an elongated, hollow stem or tube 20 that is surrounded by an elongated sleeve 22. The elongated sleeve 22 includes a screw clamp 24 formed on one of its ends which is designed to clamp the sleeve 22 to the stem 20 and prevent rotation therebetween. The sleeve 22 includes a plurality of outlets or outlet conduits 26 spaced around its periphery. These outlets 26 can be fitted with a desired component, such as, for example, a regulator 28, a start-up/shutdown valve 30, and a pressure gauge 32. All of these components are in communication with the pressure tank 14 through the stem 20 and elongated sleeve 22. Additionally, a safety valve 33 can be fitted to an outlet 26 or, as illustrated in this embodiment, to the stem 20 within the sleeve 22 as will be explained in further detail hereinafter.

The elongated hollow stem 20 has a proximal end 34 and a distal end 36. The proximal end 34 is provided with a plurality of threads 38 that cooperate with corresponding threads 40 on the interior surface of the compressed air outlet conduit 16 to thereby threadingly affix the stem 20 to the pressure tank 14. Proximate the threads 38, a hexagonal shoulder or nut 42 is integrally formed with the stem 20 to allow tightening of the threads 38 with respect to the threads 40 and to provide a shoulder upon which the sleeve 22 can be bottomed A resilient sealing ring or "O"-ring 44 is located near both ends of the stem 20 and rests in a channel 46. The channel 46 is formed between first and second radially extending shoulders 48 and 50 which are integrally formed to the stem 20 near its proximal and distal ends 34 and 36. The outside diameter of each of the shoulders 48 and 50 is slightly smaller than the outside diameter of each sealing ring or "O"-ring 44 for sealing and rotational engagement as will be explained hereinafter.

In the embodiment illustrated, a reduced diameter central portion 52 of the stem 20 is formed between the hexagonal shoulder 42 and the distal end 36 of the stem 20 which is defined on its longitudinal ends by the radially extending shoulders 48. It is to be noted that the reduced diameter central portion 52 may have a variety of shapes and sizes or may be eliminated without departing from the teachings of the present invention.

The stem 20 is hollow throughout its length and may be sealed at its distal end 36 by a spring loaded check valve or safety valve 33. The safety valve 33 may be integrally formed with or threaded onto the stem 20 or may be affixed in any desired manner and has a shoulder 53 that restricts longitudinal movement of the sleeve 22 when placed on the stem 20. The safety valve 33 is of a conventional design that can automatically release air if excess pressure is attained within the pressure tank 14 and can also be manually activated by a stem 54 that can release air from an aperture 55, for example. The safety valve 33 normally includes a spring (not shown) that prevents the release of air pressure until a desired limit is reached, this being a function of the size and type of spring used.

Alternatively, the safety valve 33 may be omitted and the distal end 36 of the stem 20 may be formed with an end wall or threaded with a plug (not shown) to seal the distal end 36 of the hollow stem 20. The end wall or plug may extend above the distal end of the stem 20 or the stem may be lengthened to enable proper operation of the screw clamp 24 as will be described later.

A lateral aperture 56 is formed through the sidewall of the stem 20 within the reduced diameter central portion 52 intermediate the sealing or "O"-rings 44. The lateral aperture 56 permits air to flow from within the tank 14 through and out of the stem 20.

The elongated sleeve 22 has an interior surface 58 having a diameter somewhat smaller than the outside diameter of each sealing or "O"-ring 44. The diameter of the inner surface 58, however, is slightly larger than the outside diameter of each shoulder 48 and 50 in order to provide contact and an effective seal between the stem 20 and the sleeve 22. As illustrated in FIG. 2, a sealed circumferential chamber 60 thereby exists between the reduced diameter central portion 52 of the stem 20 and the interior surface 58 of the sleeve 22 that extends around the stem 20 and is sealed on its longitudinal ends by the "O"-rings 44. This design allows the sleeve 22 to rotate about the stem 20 without breaking the seal formed by the "O"-rings 44. Accordingly, a flow path is formed between the tank 14 and the chamber 60 trough the stem 20 and the lateral aperture 56.

As described above, the sleeve 22 may have a plurality of outlets or outlet conduits 26 spaced around its periphery. The outlets 26 are integrally formed with and extend through the sleeve 22, communicating with the chamber 60. Each outlet 26 can in turn be fitted with a desired component, such as the regulator 28, the start-up/shutdown valve 30, or the pressure gauge 32, all of which receive air from the pressure tank 14 through the stem 20 via lateral aperture 56 and chamber 60. Accordingly, as illustrated by the arrows in FIG. 3, the sleeve 22 having any number of components affixed thereto can be rotated with respect to the stem 20 to a desired position. This construction aids the operator in viewing or adjusting the components before or during operation of the compressor 12 without disrupting air flow or pressure.

In the illustrated embodiment, the regulator 28 has a ball 62 that is designed to seal off an opening 64 which is in communication with the chamber 60 through an outlet 26. A rigid support stem 66 is affixed to the side of the ball 62 opposite the opening 64 and is coupled to a spring 68 via a diaphragm assembly 70. The illustrated structure, allows adjustment of the air flow through the regulator 28. To this end, the spring 68 receives a portion of a bolt 74 that is threadingly engaged on a first nut 72. The end of the bolt 74 opposite the diaphragm 70 is somewhat reduced in diameter and is affixed to a knob 76 by a second nut 77. The spring 68, the nut 72, and the bolt 74 are enclosed by a housing 78 whose interior surface 80 is longitudinally keyed to prevent rotational movement of the first nut 72 about the bolt 74 upon rotation of the bolt 74 by the knob 76. Accordingly, with this structure, adjustment of the air flow through the regulator 28 is accomplished by rotation of the knob 76 which in turn provides longitudinal movement of the first nut 72 along the bolt 74. The first nut 72 then compresses the spring 68 which engages the diaphragm 70 forcing the stem 66 and the ball 62 into engagement with the opening 64. This controls air flow from the chamber 60 through the outlet 26, regulator 28, and into the compressed air hose 17 through an outlet 84 of the regulator 28.

The regulator 28, the start-up/shutdown valve 30, and the pressure gauges 32 may be threadingly engaged to the outlets 26 of the sleeve 22. As can readily be discerned, the number of outlets 26 about the periphery of sleeve 22 may vary in order to accommodate the various components which one may desire to hook up to the outlet conduit 16 of the pressure tank 14.

As illustrated in FIGS. 2 and 3, the screw clamp 24 is of a conventional design and may be integrally formed on one end of the sleeve 22 in order to restrict rotational movement of the sleeve 22 and its associated components about the stem 20. The screw clamp 24 has a central bolt 86 whose distal end 88 is fitted with a knob 90 and whose proximal end 92 has a head portion 94 which is slightly tapered at a bottom portion 95. The head portion 94 is located within a housing 96 that is formed in the sleeve 22. Proximate the knob 90 is a sleeve 98 that also is located within the housing 96, is slightly tapered at an end 100 and is capable of longitudinal movement along the central bolt 86. In operation, when the knob 90 is rotated clockwise with respect to FIG. 2, it forces the sleeve 98 forward and the taper 100 against one side of the safety valve 33 on the stem 20 while it simultaneously pulls the taper 95 of the head portion 94 against the other side of the safety valve 33 through the bolt 86. The screw clamp 24 is thereby capable of restricting rotational movement of the sleeve 22 about the stem 20 as well as restricting longitudinal movement therebetween Alternatively, as previously described, if no safety valve 33 is to be fitted to the stem 20, an end cap or plug (not shown) can be used. The end cap functions to seal off the distal end 36 of the stem 20. The end cap would have a sufficient longitudinal length to enable proper engagement of the screw clamp 24 and can have a radially extending shoulder, similar to shoulder 53 of safety valve 33, to restrict longitudinal movement of the sleeve 22 on the stem 20. However, the size and shape of the end cap can vary, and the radially extending shoulder 53 can be omitted. To this end, restriction of the longitudinal movement between the sleeve 22 and stem 20 can be accomplished by the "O"-rings 44 and the screw clamp 24 alone.

In assembling the mount 10 of the illustrated embodiment, the proximal end 34 of the stem 20 is threadingly engaged to the threads 40 of the outlet conduit 16 by threads 38 with the aid of the integral hexagonal shoulder 42. Next, the sleeve 22 with the screw clamp 24 in its opened position is placed over the stem 20 which has the "O"-rings 44 affixed thereto. The sleeve 22 is bottomed on the integral hexagonal shoulder 42 and the rotational seal is provided between the sleeve 22 and the stem 20. Next, the safety valve 33 is affixed to the distal end 36 of the stem 20 to seal off the distal end 36 and to restrict longitudinal movement of the sleeve 22 on the stem 20. The screw clamp 24 is then tightened and, finally, the desired components are fitted to the outlets 26 of the sleeve 22. Alternatively, the sleeve 22, with or without the desired components attached, can first be fitted to the stem 20 that would then be threaded to the outlet conduit 16.

In operation, the screw clamp 24 is loosened by turning knob 90. Thereafter, the sleeve 22 is rotated about the stem 20 to a desired position, as illustrated by the arrows in FIG. 3, so that the components can be readily accessible. Once a desired position is obtained, the screw clamp 24 is tightened to maintain the sleeve 22 in the desired position.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A swivel mount for an outlet conduit of a pressure vessel comprising:
   a hollow tube having an open end and a closed end;
   means for connecting the open end of the tube to the outlet conduit;
   a sleeve surrounding the tube for rotation thereabout;
   means for sealing the sleeve in rotational sealing engagement with the tube;
   means for providing a flow path from the outlet conduit through the tube to the sleeve, and from the sleeve;
   and a screw clamp between said sleeve and said hollow tube, said screw clamp being tightenable to restrict rotation of said sleeve on said tube.

2. A swivel mount for an outlet of a pressure vessel comprising:
   an elongated, hollow stem having an open proximal end for connection with the outlet of the pressure vessel and a closed distal end, the stem having a reduced diameter central portion displaced between the distal and proximal ends, the stem having a threaded section proximate its proximal end, a first resilient sealing ring surrounding the stem positioned between the threaded section and the reduced diameter central portion, a second resilient sealing ring surrounding the stem positioned between the distal end and the reduced diameter central portion and at least one aperture through the wall of the stem positioned in the reduced diameter central portion;
   an elongated sleeve surrounding the stem having at least one outlet along its length, the outlet being formed at a position along the length of the sleeve corresponding to the position of the reduced diameter central portion of the stem, the sleeve having an inside diameter in sealing engagement with the first and second resilient sealing rings, the sleeve cooperating with the sealing rings and the reduced diameter central portion of the stem to define a sealed chamber therebetween and to provide a rotational seal between the stem and the sleeve on opposite sides of the reduced diameter central portion of the stem; and
   a screw clamp formed on the elongated sleeve which, when the sleeve is placed over the stem, lies between the second resilient sealing ring and the distal end of the stem and the stem may be threadingly engaged within the outlet of the pressure vessel and material within the pressure vessel may flow through the stem and the lateral aperture in the stem into the chamber and through the outlet of the sleeve to the exterior of the sleeve and the sleeve may be rotated about the stem to a desired position and the screw clamp may be tightened to prevent further rotational and longitudinal movement of the sleeve with respect to the stem.

3. The swivel mount of claim 2, wherein the hollow stem has an integrally formed shoulder between the threaded section and the first resilient sealing ring to aid in attachment of the stem to the outlet of the pressure vessel and upon which the elongated sleeve is bottomed.

4. The swivel mount of claim 2, having a means for further restricting longitudinal movement of the sleeve on the stem.

5. The swivel mount of claim 4, wherein the means for further restricting longitudinal movement of the sleeve on the stem is an outwardly extending radial shoulder on the distal end of the stem.

6. The swivel mount of claim 2, wherein the stem is fitted with a safety valve which releases excess pressure and forms the distal end of the stem, the safety valve being capable of sealing off the stem and having an outwardly extending radial shoulder restricting longitudinal movement of the sleeve on the stem and having a sufficient longitudinal length to enable the screw clamp to engage its outer surface.

7. The swivel mount of claim 6, wherein the elongated sleeve has four outlets, two of the outlets being fitted with respective pressure gauges, one outlet being fitted with a pressure regulator, and the remaining outlet being fitted with a start-up and shutdown valve.

8. The swivel mount of claim 4, wherein the first and second resilient sealing rings are displaced within a channel formed in the stem to prevent their longitudinal movement along the stem.

9. A rotatable mounting for a pressure regulator and a pressure gauge on a pressurized medium storage tank, comprising:
   a hollow stem having an open end mounted in communication with the pressurized medium storage tank, said stem having an aperture opening laterally into a hollow interior thereof intermediate opposite ends of said hollow stem;
   a sleeve received over said hollow stem and covering said aperture;
   first and second seal rings mounted to seal between said stem and said sleeve on opposite sides of said aperture;
   at least one outlet extending from an internal surface of said sleeve to the pressure regulator and the pressure gauge to provide communication from said aperture to the pressure regulator and the pressure gauge;
   the pressure regulator and the pressure gauge being mounted on said sleeve;
   said sleeve being rotoatable on said hollow stem to permit rotation of the pressure regulator and the pressure gauge to different positions for viewing of the pressure gauge regardless of the position of the storage tank.

10. A rotatable mounting as claimed in claim 9, wherein said hollow stem is mounted directly in the pressurized medium storage tank.

11. A rotatable mounted as claimed in claim 9, further comprising:
   a pressurized medium inlet in said sleeve in communication with said aperture, said pressurized medium inlet being connectable to a source of pressurized medium.

12. A rotatable mounting as claimed in claim 9, further comprising:
   a locking clamp between said hollow stem and said sleeve that is operable to selectively inhibit rotation of said sleeve relative to said stem.

13. A rotatable mounting as claimed in claim 9, wherein said locking clamp includes a threaded clamp which selectively constricts against said stem.

* * * * *